(12) United States Patent (10) Patent No.: US 12,562,422 B2
Yue et al. (45) Date of Patent: Feb. 24, 2026

(54) BATTERY

(71) Applicant: EVE POWER CO., LTD., Hubei (CN)

(72) Inventors: Liangliang Yue, Hubei (CN); Liming Huang, Hubei (CN); Yuebin Xu, Hubei (CN); Min Chen, Hubei (CN); Tianli Xiao, Hubei (CN)

(73) Assignee: EVE POWER CO., LTD., Jingmen (CN)

( * ) Notice: Subject to any disclaimer, the term of this patent is extended or adjusted under 35 U.S.C. 154(b) by 704 days.

(21) Appl. No.: 18/088,804

(22) Filed: Dec. 27, 2022

(65) Prior Publication Data

US 2024/0014487 A1     Jan. 11, 2024

Related U.S. Application Data

(63) Continuation of application No. PCT/CN2022/120767, filed on Sep. 23, 2022.

(30) Foreign Application Priority Data

Jul. 5, 2022     (CN) .......................... 202210790503.8
Jul. 5, 2022     (CN) .......................... 202221727435.2

(51) Int. Cl.
*H01M 50/188*        (2021.01)
*H01M 50/107*        (2021.01)
(Continued)

(52) U.S. Cl.
CPC ....... *H01M 50/188* (2021.01); *H01M 50/107* (2021.01); *H01M 50/184* (2021.01); *H01M 50/533* (2021.01)

(58) Field of Classification Search
CPC ............. H01M 50/188; H01M 50/107; H01M 50/184; H01M 50/533; H01M 50/538;
(Continued)

(56) References Cited

U.S. PATENT DOCUMENTS

2005/0238951 A1*   10/2005   Yoo ................... H01M 10/0431
                                                                  429/163
2014/0113185 A1     4/2014   Mori et al.
                              (Continued)

FOREIGN PATENT DOCUMENTS

CN            102856514  A       1/2013
CN            209328960  U       8/2019
                    (Continued)

OTHER PUBLICATIONS

English translation of CN111370601A (Year: 2020).*
(Continued)

*Primary Examiner* — Ula C Ruddock
*Assistant Examiner* — Sarika Gupta

(57)                    ABSTRACT

Disclosed is a battery comprising a housing, a battery cell and an end cover structure. The housing has an opening, through which the battery cell may be provided in the housing, and the end cover structure covers the opening. one end of the battery cell comprises a first electrode tab and a second electrode tab with different electrode polarities, the first and second electrode tabs are both towards the opening when the battery cell is provided in the housing, and the end cover structure comprises a first electrode connecting part and a second electrode connecting part, the first electrode connecting part is electrically connected to the first electrode tab and the second electrode connecting part is electrically connected to the second electrode tab when the end cover structure covers the opening, the first electrode connecting part and the second electrode connecting part are connected by insulating sealing part.

17 Claims, 6 Drawing Sheets

(51) Int. Cl.
 *H01M 50/184* (2021.01)
 *H01M 50/533* (2021.01)
(58) Field of Classification Search
 CPC .. H01M 50/55; H01M 50/559; H01M 50/566;
 H01M 50/567; H01M 50/152; Y02E
 60/10
 See application file for complete search history.

(56) References Cited

U.S. PATENT DOCUMENTS

| | | | |
|---|---|---|---|
| 2016/0049633 | A1 | 2/2016 | Kang |
| 2018/0205044 | A1* | 7/2018 | Urushihara ............. H01M 4/06 |

FOREIGN PATENT DOCUMENTS

| | | | |
|---|---|---|---|
| CN | 210074010 | U | 2/2020 |
| CN | 111370601 | A * | 7/2020 |
| CN | 113571848 | A | 10/2021 |
| CN | 214411447 | U | 10/2021 |
| CN | 215266605 | U | 12/2021 |
| CN | 215418489 | U | 1/2022 |
| CN | 216015526 | U | 3/2022 |
| CN | 114628863 | A | 6/2022 |
| CN | 216793944 | U | 6/2022 |
| CN | 218039493 | U | 12/2022 |

OTHER PUBLICATIONS

International Search Report of PCT Patent Application No. PCT/CN2022/120767 issued on Mar. 29, 2023.
Extended European Search Report of European Patent Application No. 22818598.9 issued on Feb. 14, 2025.
First Office Action issued in corresponding CN application No. 202210790503.8 dated Nov. 22, 2025.

* cited by examiner

212 }
211 } 21

2110

2120

A

3

2

1

BATTERY

CROSS REFERENCE TO RELATED APPLICATIONS

The present application is a Continuation Application of PCT Application No. PCT/CN2022/120767 filed on Sep. 23, 2022, which claims the benefit of Chinese Patent Application Nos. 202210790503.8 and 202221727435.2, both filed on Jul. 5, 2022, all contents of which are incorporated herein by reference.

FIELD OF THE INVENTION

The present application relates to the field of battery technology, for example, to a battery.

BACKGROUND OF THE INVENTION

The volumetric energy density is an important performance indicator of the battery, and the volumetric energy density directly determines the working time of the products using the battery. In the related technology, whether the battery is single electrode tab, multiple electrode tab or full electrode tab, most of them are provided with positive electrode tab or negative electrode tab at both ends of the winding core, and then the positive electrode tab is connected to the positive electrode column of the cover plate, and the negative electrode tab is connected to the negative electrode column of the cover plate. This structure will increase the height of the battery in the axial direction, which will lead to the reduction of the space utilization of the battery.

SUMMARY OF INVENTION

This application provides a battery that may effectively improve the space utilization of the battery and enhance the volumetric energy density of the battery.

The present application provides a battery, including:

a housing, an end of the housing is provided with an opening;

a battery cell, an end of the battery cell is provided with a first electrode tab and a second electrode tab with different electrode polarities, the battery cell is provided in the housing, the first electrode tab and the second electrode tab are both disposed towards the opening;

an end cover structure covered on the opening, the end cover structure includes a first electrode connecting part and a second electrode connecting part, the first electrode connecting part is electrically connected with the first electrode tab, the second electrode connecting part is electrically connected with the second electrode tab, and the first electrode connecting part and the second electrode connecting part are connected by an insulating sealing part.

Figure 1:
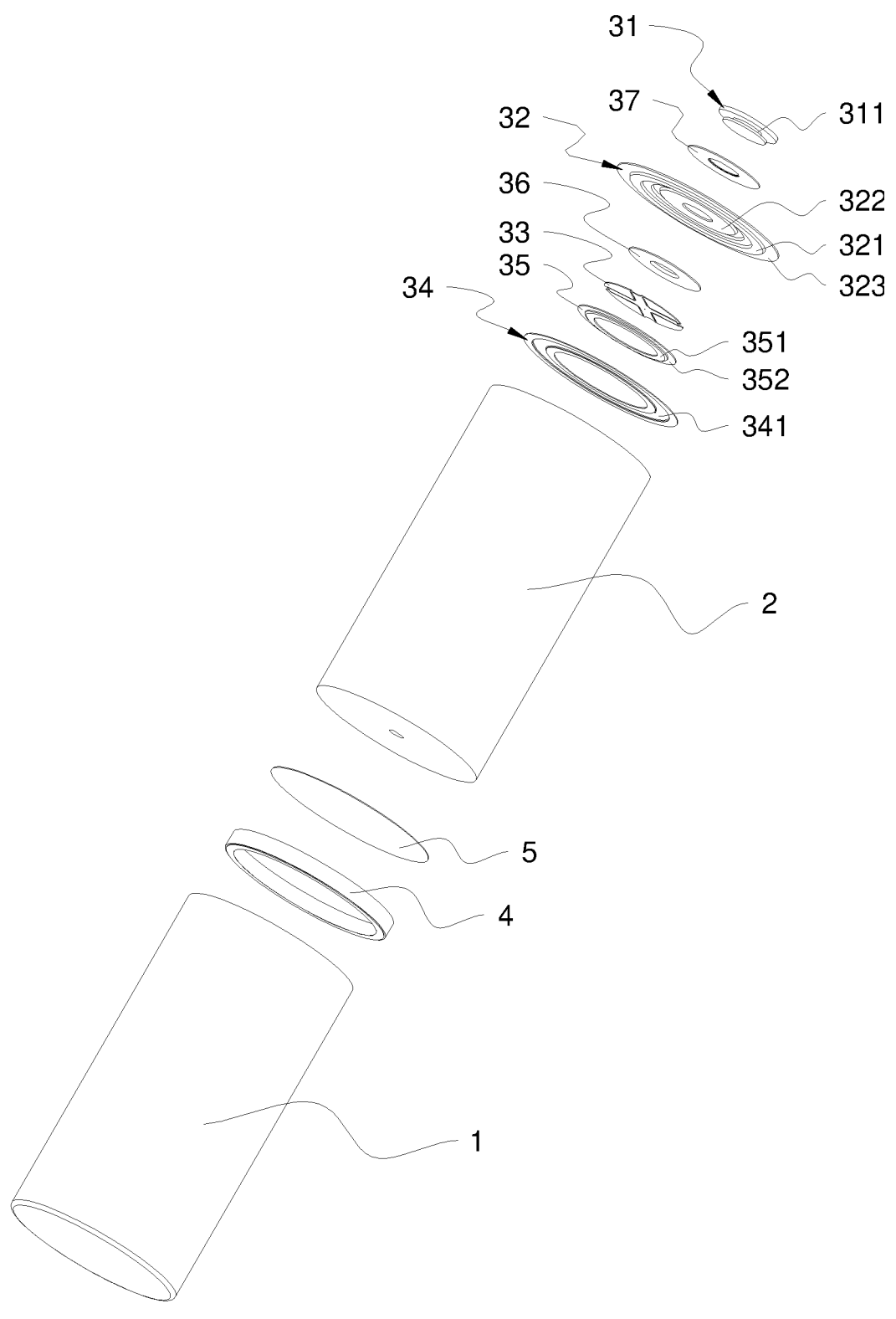
FIG. 1 is an exploded view of the battery provided in embodiment 1 of the present application.
Figure 2:
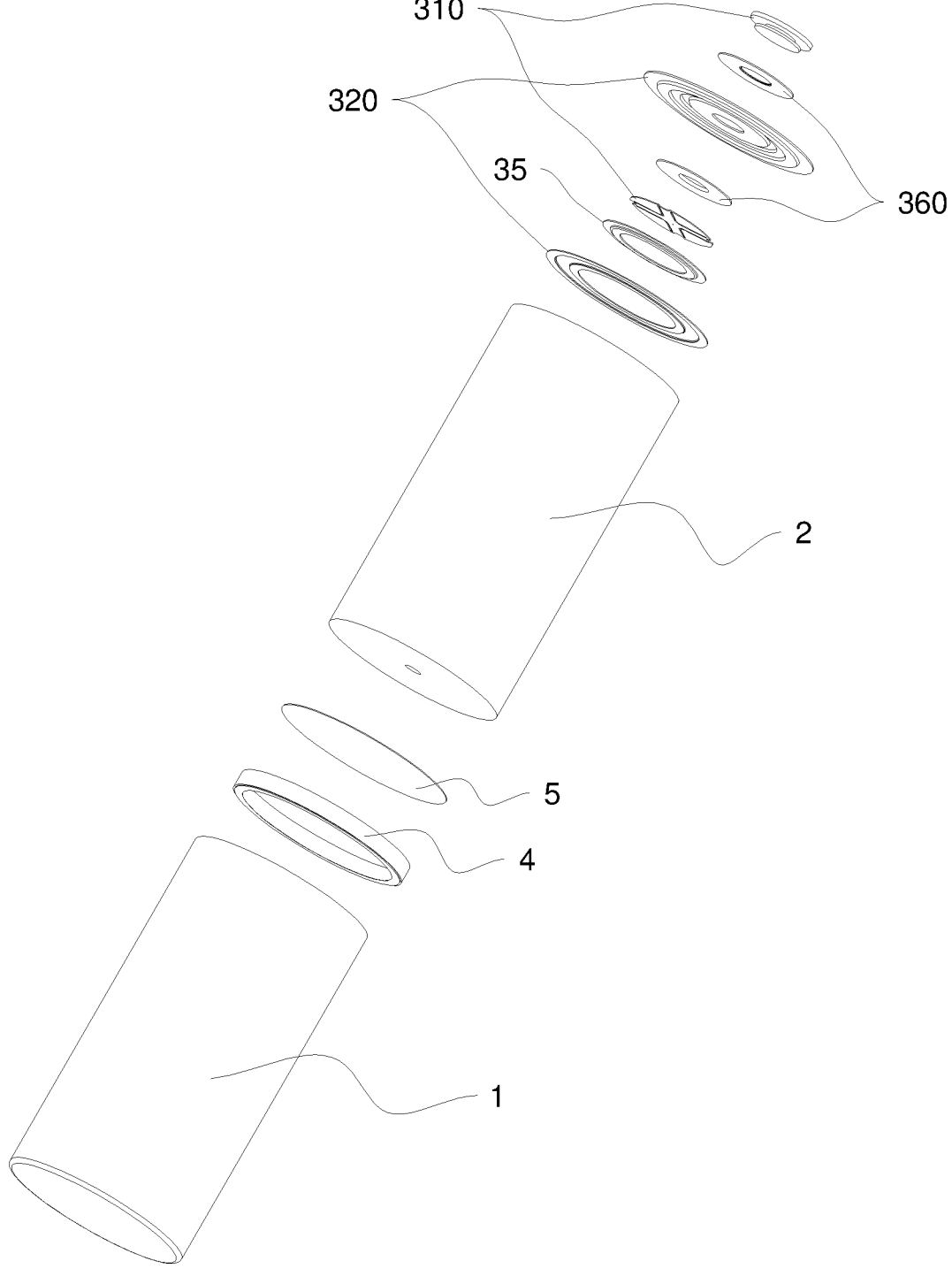
FIG. 2 is an exploded view of the battery provided in embodiment 1 of the present application.

1: housing; 2: battery cell; 20: groove; 21: battery cell electrode tabs; 211: first battery cell part; 212: second battery cell part; 22: battery cell non-electrode tabs; 2110: first electrode tab; 2120: second electrode tab; 3: end cover structure; 310: first electrode connecting part; 31: positive electrode column; 311: accommodating slot; 320: second electrode connecting part; 32: cover plate; 321: connecting concave part; 322: inner ring; 323: outer ring; 33: positive current collector plate; 34: negative current collector plate; 341: connecting convex part; 35: insulating part; 351: first insulating part; 352: second insulating part; 360: insulating sealing part; 36: first sealing ring; 37: second sealing ring; 4: insulating gasket; 5: insulating cover.

DETAILED DESCRIPTION OF THE PREFERRED EMBODIMENTS

It is to be understood that the embodiments described herein are only intended to explain the present application. It is also to be noted that, for ease of description, the attached drawings show only a portion, but not all, of the embodiments relating to the present application.

In the description of this application, the terms "connect", "join" and "fix" shall be understood in a broad sense unless otherwise explicitly specified and limited. For example, it can be a fixed connection, a detachable connection, or an integral body; it can be a mechanical connection or an electrical connection; it can be a direct connection or an indirect connection through an intermediate medium, and it can be a connection within two components or an interaction relationship between two components. To a person of ordinary skill in the art, the actual meaning of the above terms in the present application may be understood according to the actual situation.

In the present application, unless otherwise explicitly specified and limited, the first feature "above" or "under" the second feature may include that the first and second features are in direct contact, or that the first and second features are not in direct contact but are in contact through another feature between them. Furthermore, the first feature being "on top of", "over" and "above" the second feature includes the first feature being directly above and obliquely above the second feature, or simply indicating that the level of the first feature is higher than the level of the second feature. The first feature being "beneath", "under" and "below" the second feature includes the first feature being directly below and obliquely below the second feature, or simply indicating that the level of the first feature is lower than the level of the second feature.

In the description of the present embodiments, the terms "up", "down", "left", "right" and other orientation or position relationships are based on the orientation or position relationships shown in the attached drawings. It is intended to facilitate description and simplify operation, not to indicate or imply that the referred device or element has a particular orientation, or is constructed and operated in a particular orientation. Therefore, they may not be construed as a limitation of the present invention. In addition, the terms "first" and "second" are used for descriptive distinction and have no special meaning.

The present application is described below in conjunction with the attached drawings and by means of preferred embodiments.

Embodiment 1

As shown in FIG. 1 to FIG. 5, the present embodiment provides a battery that may effectively improve the space utilization of the battery in the axial direction, enhance the volumetric energy density of the battery, and ensure the performance of the product. The battery includes a housing 1, a battery cell 2 and an end cover structure 3. An end of the housing 1 is provided with an opening. The battery cell 2 may be provided inside the housing 1 through the opening. The end cover structure 3 covers the opening, which may enclose the battery cell 2 in the housing 1. The end cover structure 3 is electrically connected to the battery cell 2 to ensure the regular operation of the battery.

In order to improve the space utilization in the axial direction of the battery, in the present embodiment, an end of the battery cell 2 is provided with a first electrode tab 2110 and a second electrode tab 2120 with different electrode polarities, and the first electrode tab 2110 and the second electrode tab 2120 are both disposed toward the opening when the battery cell 2 is placed in the housing 1. The end cover structure 3 covers the opening, and the end cover structure 3 includes a first electrode connecting part 310 and a second electrode connecting part 320, wherein the first electrode connecting part 310 is electrically connected to the first electrode tab 2110 and the second electrode connecting part 320 is electrically connected to the second electrode tab 2120, and the first electrode connecting part 310 and the second electrode connecting part 320 are connected by an insulating sealing part 360 to avoid short-circuit caused by the contact between the positive electrode and the negative electrode of the battery.

Preferably, in the present embodiment, the first electrode tab 2110 is a positive electrode tab. The first electrode tab connecting part 310 includes a positive electrode column 31 and a positive current collector plate 33. The positive current collector plate 33 is provided on the battery cell 2. The positive electrode tab is connected to the positive electrode column 31 by the positive current collector plate 33. The second electrode tab 2120 is a negative electrode tab. The second electrode tab connecting part 320 includes a cover plate 32 and a negative current collector plate 34. The negative current collector plate 34 is provided on the battery cell 2. The negative electrode tab is connected to the cover plate 32 by the negative current collector plate 34.

Figure 3:
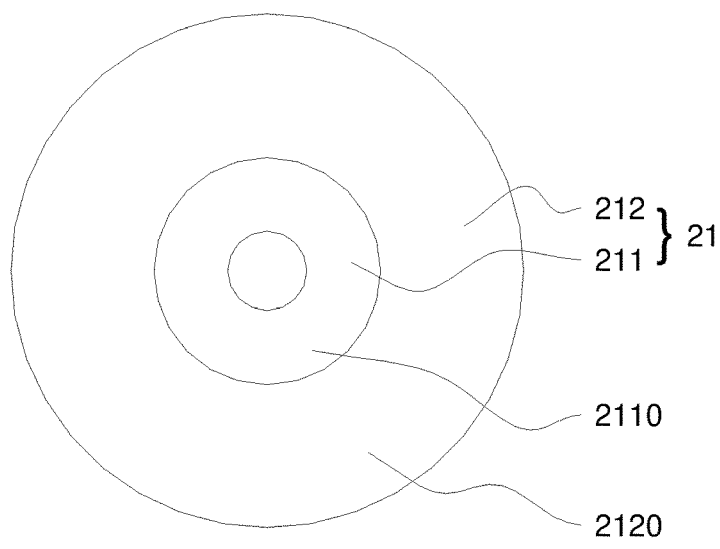
FIG. 3 is a cross-sectional view of the battery cell provided in embodiment 1 of the present application.
Figure 4:
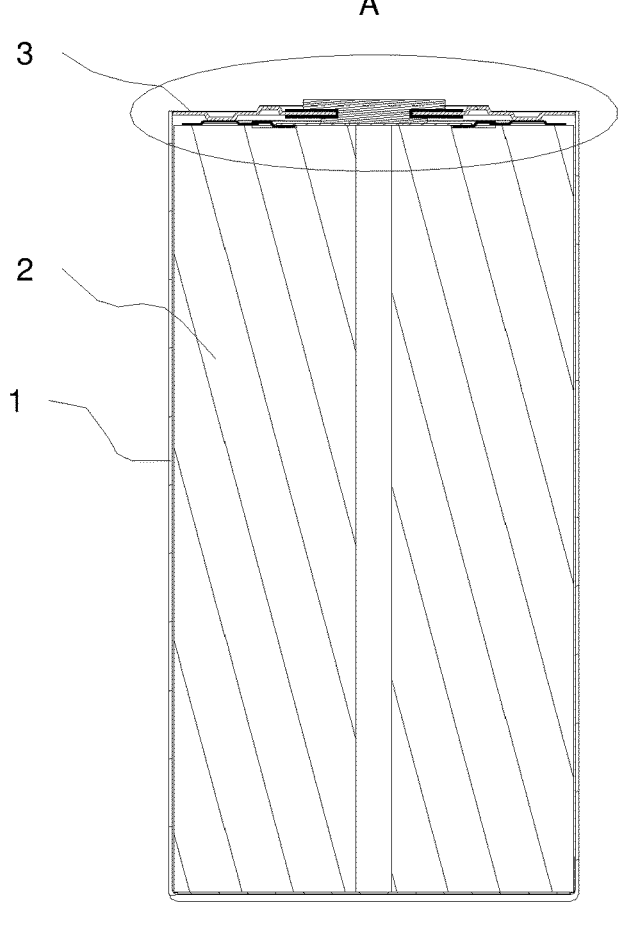
FIG. 4 is a cross-sectional view of the battery provided in embodiment 1 of the present application.

As shown in FIG. 3, in the present embodiment, a first battery cell part 211 is a circular structure. A second battery cell part 212 is a ring-shaped structure. As may be understood, the battery cell 2 is formed by winding the positive electrode sheet, the separator and the negative electrode sheet. A side of the positive electrode sheet in a width direction is provided with a positive current collector. A side of the negative electrode sheet in a width direction is provided with a negative current collector. In order to make the battery cell 2 formed by winding, which is provided with positive electrode tabs without negative electrode tabs in the first battery cell part 211 and is provided with negative electrode tabs without positive electrode tabs in the second battery cell part 212, part of the negative current collector and part of the positive current collector may be removed before winding. In other words, during the initial winding process, the wound positive electrode sheet is provided with the positive current collector and the negative electrode sheet is not provided with negative current collector. In the subsequent winding process, the wound positive electrode sheet is not provided with positive current collector and the wound negative electrode sheet is provided with negative current collector. In order to ensure the electrical connection between the positive electrode tab and the positive current collector plate 33 and the electrical connection between negative electrode tab and the negative current collector plate 34, the negative current collector plate 34 is provided in accordance with the shape of the second battery cell part 212 on the second battery cell part 212, and the positive current collector plate 33 is provided in accordance with the shape of the first battery cell part 211 on the first battery cell part 211. Then, a side of the positive current collector plate 33 that is not abutted by the battery cell 2 is welded to the positive electrode column 31, and a side of the negative current collector plate 34 that is not abutted by the battery cell 2 is welded to the cover plate 32.

In one embodiment, the end cover structure 3 further includes an insulating part 35, which is provided on the battery cell 2, wherein one side of the insulating part 35 is connected to the positive current collector plate 33, and the other side of the insulating part 35 is connected to the negative current collector plate 34, so as to avoid short-circuit caused by the contact between the positive current collector plate 33 and the negative current collector plate 34 due to the vibration of the battery cell 2. Alternatively, the positive current collector plate 33 and the negative current collector plate 34 are adhesively connected to the insulating part 35.

In order to ensure that the positive current collector plate 33 and the negative current collector plate 34 are always separated by the insulating part 35, the insulating part 35 provided in the present embodiment includes a first insulating part 351 and a second insulating part 352 that are not located in the same plane, wherein the first insulating part 351 and the second insulating part 352 are connected by a transitional section set at an oblique angle. When the first insulating part 351 is connected to the positive current collector plate 33, the positive current collector plate 33 is adhesively connected to the side of the first insulating part 351 that is facing away from the battery cell 2. When the second insulating part 352 is connected to the negative current collector plate 34, the negative current collector plate 34 is adhesively connected to the side of the second insulating part 352 near the battery cell 2. That is, in the horizontal direction, the positive current collector plate 33 and the negative current collector plate 34 are always located on different sides of the transitional section. Even if the positive current collector plate 33 and negative current collector plate 34 are infinitely close to each other, they will still be separated by the transitional section.

Figure 5:
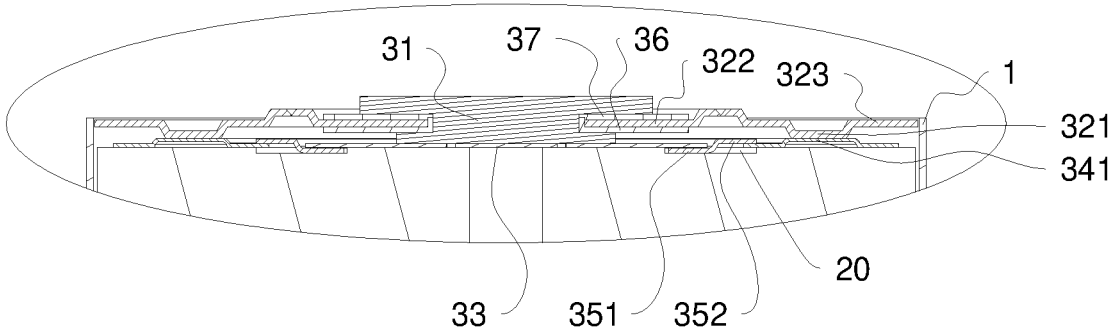
FIG. 5 is an enlarged view at A in FIG. 4.

Alternatively, an end side of the battery cell 2 includes a groove 20, wherein the insulating part 35 is provided in the groove 20. As can be seen in FIG. 5, the depth of the groove 20 may be identical to the thickness of the first insulating part 351, wherein when the first insulating part 351 is provided in the groove 20, the side facing away from the battery cell 2, of the first insulating part 351, can abut with the side of the positive current collector plate 33 abutting against the battery cell 2, at that time the side of the second insulating part 352 close to the battery cell 2 needs to be in contact with the side of the negative current collector plate 34 facing away from the battery cell 2. Correspondingly, the positive current collector plate 33 is a circular structure and the negative current collector plate 34 is a ring-shaped structure. Therefore, the insulating part 35 is a ring-shaped structure between the positive current collector plate 33 and the negative current collector plate 34. The groove 20 is a ring-shaped groove.

In one embodiment, in order to ensure the strength of the connection between the cover plate 32 and the negative current collector plate 34, the cover plate 32 includes a connecting concave part 321 provided towards the battery cell 2, while the negative current collector plate 34 includes a connecting convex part 341 facing away from the battery cell 2, and the connecting convex part 341 is connected with the connecting concave part 321. Since welding of the connection may cause welding defects in the part of the cover plate 32, the welding effect can be ensured by filling with glue applied to the connecting convex part 341 after welding.

Alternatively, the positive electrode column 31 is a columnar structure and the cover plate 32 is a ring-shaped structure, wherein an inner ring 322 of the cover plate 32 is connected to the positive electrode column 31 by an insulating sealing part 360, and an outer ring 323 of the cover plate 32 is connected to a housing 1. That is, the cover plate 32 is sleeved on the positive electrode column 31. During the riveting of the cover plate 32 and the positive electrode column 31, the circumferential surface of the positive electrode column 31 will be formed with an accommodating slot 311. In order to ensure the sealing effect of the connection between the cover plate 32 and the positive electrode column 31, and to avoid short-circuit caused by the contact between the cover plate 32 and the positive electrode column 31, the insulating sealing part 360 may be sleeved between the cover plate 32 and the positive electrode column 31. When the cover plate 32 and the positive electrode column 31 are riveted, the insulating sealing part 360 will be clamped between the accommodating slot 311 and the cover plate 32. This completely prevents contact between the cover plate 32 and the positive electrode column 31. Alternatively, the insulating sealing part 360 is a plastic ring, which is elastic and can achieve an interference fit between the cover plate 32 and the positive electrode column 31 to ensure the sealing effect.

In the present embodiment, the ratio of an outer diameter of the positive electrode column 31 to an outer diameter of the cover plate 32 ranges from 0.2 to 0.7. The ratio of the outer diameter of the positive current collector plate 33 to the outer diameter of the negative current collector plate 34 ranges from 0.45 to 0.7. The thickness of the cover plate 32 ranges from 0.4 mm to 1.5 mm. The thickness of the positive current collector plate 33 ranges from 0.1 mm to 0.5 mm. The thickness of the negative current collector plate 34 ranges from 0.1 mm–0.3 mm.

Since the insulating seal needs to ensure that the upper surface, lower surface and end surface of the cover plate 32 are not in contact with the positive electrode column 31, the insulating sealing part 360 needs to be wrapped around each of the aforementioned positions. In the present embodiment, the insulating sealing part 360 includes a first sealing ring 36 and a second sealing ring 37, both of which are ring-shaped, wherein the first sealing ring 36 includes a first sealing ring body and a connecting part convexly provided around the inner ring of the first sealing ring 36. When the first sealing ring 36, the cover plate 32 and the second sealing ring 37 are sequentially sleeved on the positive electrode column 31, the second sealing ring 37 and the first sealing ring 36 will be abut by the abutting part, and isolate the inner ring 322 of the cover plate 32 and the positive electrode column 31.

Alternatively, as shown in FIG. 1, the battery further includes an insulating gasket 4 and an insulating cover 5. When the battery cell 2 is provided in the housing 1, the insulating gasket 4 is provided on the side of the battery cell 2 without the tab. The insulating cover 5 is sleeved on the battery cell 2, and the insulating gasket 4 is sandwiched between the insulating cover 5 and the battery cell 2, so as to ensure the insulation of the battery cell 2 and the housing 1.

The battery provided in the present embodiment includes a housing, a battery cell and an end cover structure, an end of the housing includes an opening. The battery cell may be provided inside the housing through the opening. The end cover structure covers the opening to close the housing and is electrically connected to the battery cell. Only one end of the housing is provided with the end cover structure, which can effectively improve the space utilization in the axial direction of the battery, increase the volumetric energy density of the battery and ensure the performance of the product. Alternatively, an end of the battery cell is provided with a first electrode tab and a second electrode tab with different electrode polarities. When the battery cell is provided in the housing, both the first electrode tab and the second electrode tab are provided towards the opening. The end cover structure includes a first electrode connecting part and a second electrode connecting part. When the end cover structure is covered at the opening and connected to the housing, the first electrode connecting part is electrically connected to the first electrode tab and the second electrode connecting part is electrically connected to the second electrode tab. The first electrode connecting part and the second electrode connecting part are also connected by an insulating sealing part to avoid a short-circuit caused by the contact between the positive electrode and negative electrode of the battery, so as to ensure the performance of the battery.

Embodiment 2

Figure 6:
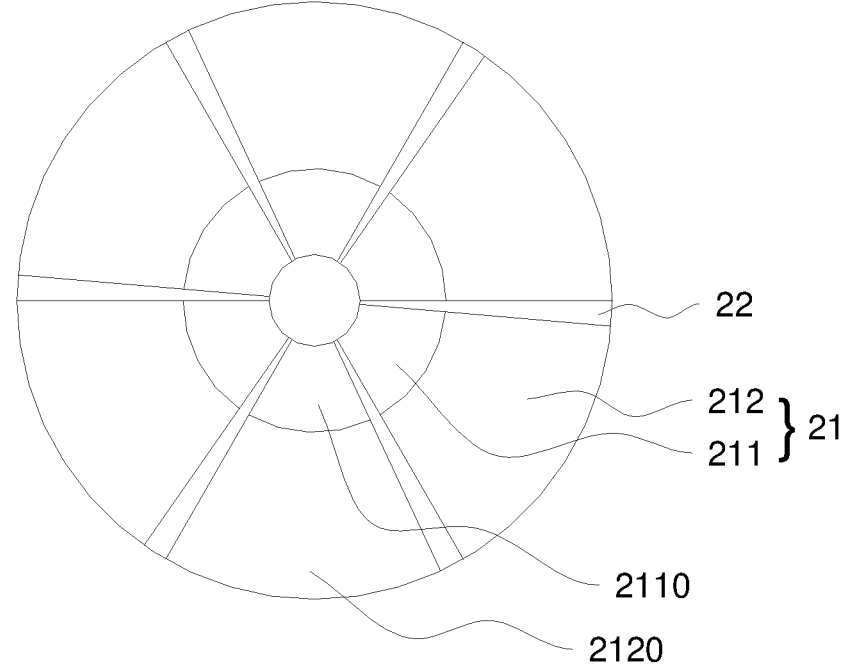
FIG. 6 is a cross-sectional view of the battery cell provided in embodiment 2 of the present application.

The present embodiment discloses a battery. The battery in the present embodiment differs from the battery in embodiment 1 in that: as shown in FIG. 6, the battery cell 2 includes battery cell electrode tabs 21 and battery cell non-electrode tabs 22 provided at intervals circumferentially along the battery cell 2. The battery cell electrode tabs 21 can be divided into a first battery cell part 211 and a second battery cell part 212, wherein the second battery cell part 212 is provided on the outer side of the first battery cell part 211. Similar to the above, the first battery cell part 211 includes only positive electrode tabs but no negative electrode tabs, and the second battery cell part 212 includes only negative electrode tabs but no positive electrode tabs, and the battery cell non-electrode tabs 22 includes no tabs. Since the battery cell non-electrode tabs 22 includes neither positive nor negative current collector, it can alleviate, to a certain extent, the problem of creasing of the battery cell 2 due to the uneven thickness of the battery cell 2 in the axial direction during the winding process of the battery cell 2.

The structure of the positive current collector plate 33 and the negative current collector plate 34 in the present embodiment is the same as in embodiment 1, i.e., when the positive current collector plate 33 is provided on the battery cell 2, the positive current collector plate 33 will be located above the first battery cell part 211 and the battery cell non-electrode tabs 22 which is between the two adjacent first battery cell part 211, and when the negative current collector plate 34 is provided on the battery cell 2, the negative current collector plate 34 will be located above the second battery cell part 212 and the battery cell non-electrode tabs 22 which is between the two adjacent second battery cell parts 212. It is to be understood that the method of the preparation of the battery cell 2 is similar to that of the battery cell 2 in embodiment 1. Positive and negative electrode sheets are simply required to retain positive or negative current collectors at the corresponding areas where positive or negative electrode tabs need to be formed.

Besides, the rest of the structure of the battery provided in the present embodiment is the same as that of the battery in embodiment 1, and hence will not be further repeated here.

Embodiment 3

Figure 7:
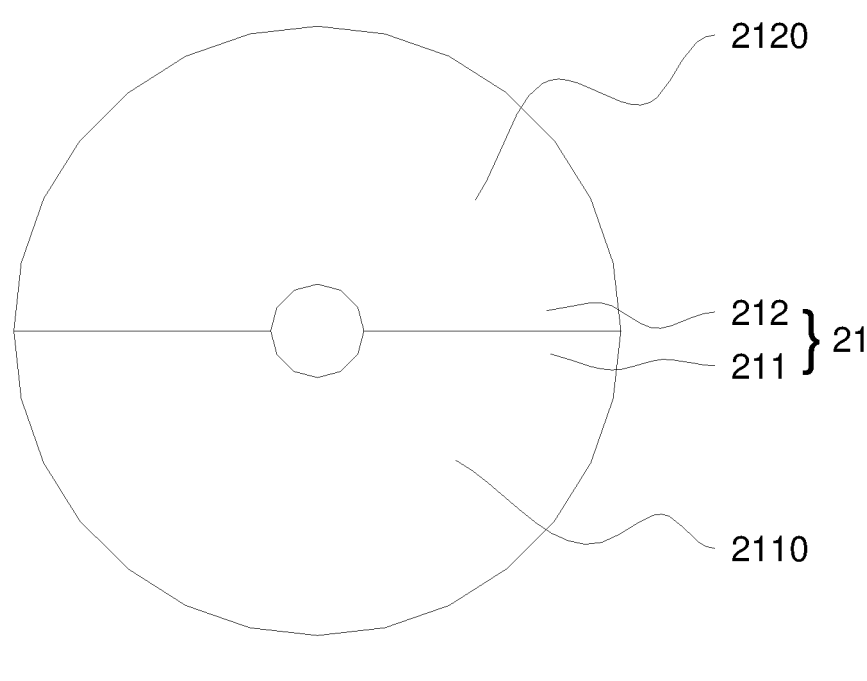
FIG. 7 is a cross-sectional view of the battery cell provided in embodiment 3 of the present application.
Figure 8:
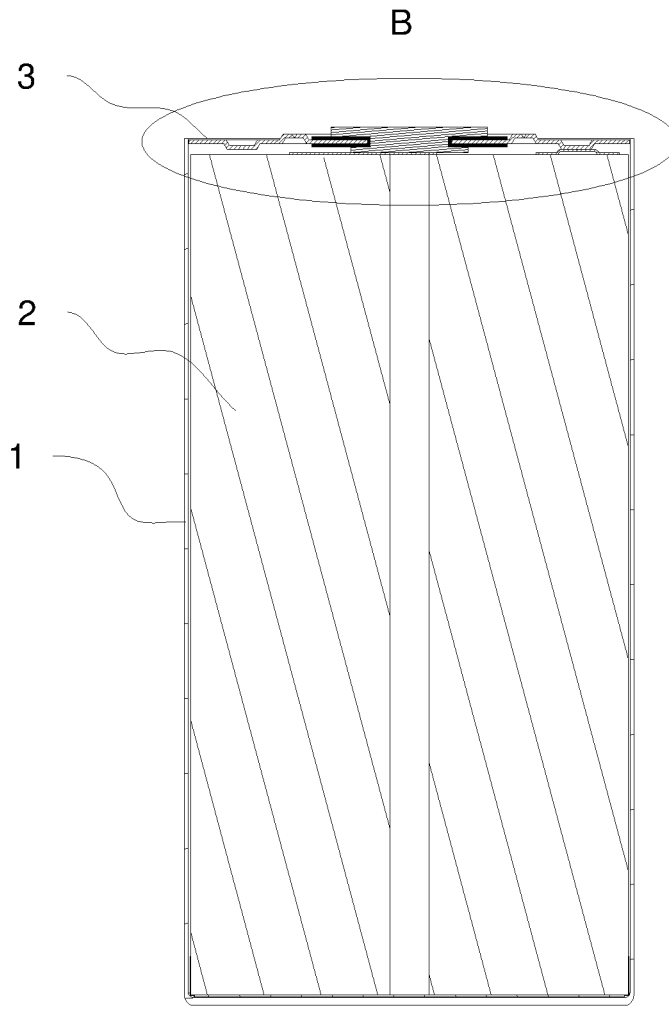
FIG. 8 is a cross-sectional view of the battery provided in embodiment 3 of the present application.
Figure 9:
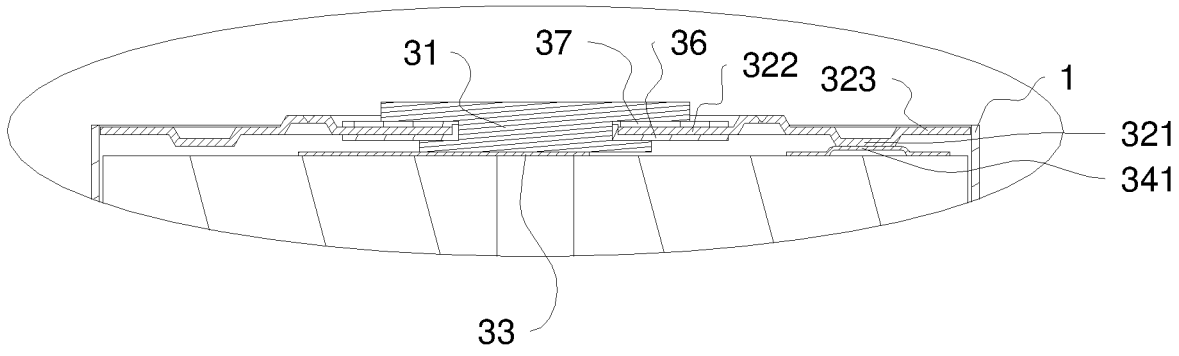
FIG. 9 is an enlarged view at B in FIG. 8.

The present embodiment discloses a battery. The battery in the present embodiment differs from the battery in Embodiment 1 in that: as shown in FIG. 7 to FIG. 9, the battery cell 2 includes the first battery cell part 211 and the second battery cell part 212, which are radially symmetrically provided, wherein the first battery cell part 211 includes only positive electrode tabs and no negative electrode tabs, and the second battery cell part 212 includes only negative electrode tabs and no positive electrode tabs, and the positive current collector plate 33 is provided on the first battery cell part 211 and the negative current collector plate 34 is provided on the second battery cell part 212. Referring to FIG. 7, it may be seen that both the first battery cell part 211 and the second battery cell part 212 are semi-circular structure. The positive current collector plate 33 may be provided in a semi-circular shaped structure, and the negative current collector plate 34 may be provided in a semi-ring shaped structure. That is, the structures of positive current collector plate 33 and negative current collector plate 34 are different from those provided in embodiment 1 and embodiment 2. The positive current collector plate 33 is provided on a side of the negative current collector plate 34, instead of on the inner ring of the negative current collector plate 34.

Similar to the sizes of each part of the end cover structure 3 in embodiment 1, the ratio of the radius of the positive current collector plate 33 to the radius of the outer ring of the negative current collector plate 34 ranges from 0.45 to 0.7. In addition, the ratio of the outer diameter of the positive electrode column 31 to the outer diameter of the cover plate 32 ranges from 0.2 to 0.7. The thickness of the cover plate 32 ranges from 0.4 mm to 1.5 mm. The thickness of the positive current collector plate 33 ranges from 0.1 mm to 0.5 mm. The thickness of the negative current collector plate 34 ranges from 0.1 mm to 0.3 mm.

Under this arrangement, the positive current collector plate 33 is welded to the positive electrode column 31. The positive current collector plate 33 should not exceed the position of the winding hole formed by the battery cell 2 during the winding process, i.e. the distance between the positive current collector plate 33 and the negative current collector plate 34 is relatively large, so that the structure of the insulating part 35 can be omitted to simplify the battery assembly process. Alternatively, the positive electrode column 31 is welded to the battery cell 2 through the positive current collector plate 33, hence there is a distance between the positive electrode column 31 and the battery cell 2. Therefore, even if the positive electrode column 31 is provided in the middle of the battery cell 2, the positive electrode column 31 is still not in contact with the second battery cell part 212, i.e. no short circuit will occur.

Besides, the rest of the structure of the battery provided in the present embodiment is the same as that of the battery in embodiment 1, and hence will not be further repeated here.

The invention claimed is:

1. A battery comprising: a housing (1), an end of the housing (1) is provided with an opening; a battery cell (2), an end of the battery cell (2) is provided with a first electrode tab (2110) and a second electrode tab (2120) with different electrode polarities, the battery cell (2) is provided in the housing (1), the first electrode tab (2110) and the second electrode tab (2120) are both disposed towards the opening; an end cover structure (3) covered on the opening, the end cover structure (3) comprises a first electrode connecting part (310) and a second electrode connecting part (320), the first electrode connecting part (310) is electrically connected with the first electrode tab (2110), the second electrode connecting part (320) is electrically connected with the second electrode tab (2120), and the first electrode connecting part (310) and the second electrode connecting part (320) are connected by an insulating sealing part (360); wherein the first electrode tab (2110) is a positive electrode tab, the first electrode connecting part (310) comprises a positive electrode column (31) and a positive current collector plate (33), and the positive electrode column (31) is connected with the positive electrode tab by the positive current collector plate (33); the second electrode tab (2120) is a negative electrode tab, the second electrode connecting part (320) comprises a cover plate (32) and a negative current collector plate (34), the cover plate (32) is connected with the negative electrode tab by the negative current collector plate (34), the positive electrode column (31) is connected with the cover plate (32) by the insulating sealing part (360), wherein the negative current collector plate (34) is provided with a connecting convex part (341) facing away from the battery cell (2), the cover plate (32) is provided with a connecting concave part (321) facing the battery cell (2), and the connecting convex part (341) abuts the connecting concave part (321).

2. The battery according to claim 1, wherein the battery cell (2) comprises a first battery cell part (211) and a second battery cell part (212), the second battery cell part (212) is provided along a circumferential direction of the first battery cell part (211), the first battery cell part (211) comprises the positive electrode tab, the positive current collector plate (33) is provided on the first battery cell part (211), the second battery cell part (212) comprises the negative electrode tab, the negative current collector plate (34) is provided on the second battery cell part (212).

3. The battery according to claim 1, wherein the battery cell (2) comprises battery cell electrode tabs (21) and battery cell non-electrode tabs (22) provided at intervals along a circumferential direction of the battery cell (2), the battery cell electrode tabs (21) comprises first battery cell parts (211) and second battery cell parts (212) provided outside of the first battery cell part (211), the first battery cell part (211) comprises the positive electrode tab, the second battery cell part (212) comprises the negative electrode tab, the positive current collector plate (33) is provided on the first battery cell part (211) and the battery cell non-electrode tabs (22) between two adjacent first battery cell parts (211), and the negative current collector plate (34) is provided on the second battery cell part (212) and the battery cell non-electrode tabs (22) which is between two adjacent second battery cell parts (212).

4. The battery according to claim 1, wherein the battery cell (2) comprises a first battery cell part (211) and a second battery cell part (212), which are radially symmetrically provided, the first battery cell part (211) is provided with the positive electrode tab, the positive current collector plate (33) is provided on the first battery cell part (211), the second battery cell part (212) is provided with the negative electrode tab, and the negative current collector plate (34) is provided on the second battery cell part (212).

5. The battery according to claim 2, wherein the end cover structure (3) further comprises an insulating part (35), the insulating part (35) is provided on the battery cell (2), and a side of the insulating part (35) is connected with the positive current collector plate (33), another side of the insulating part (35) is connected with the negative current collector plate (34).

6. The battery according to claim 5, wherein the insulating part (35) comprises an first insulating part (351) and an second insulating part (352), the first insulating part (351) and the second insulating part (352) are not located on a same plane, the positive current collector plate (33) is connected to a side of the first insulating part (351) facing away from the battery cell (2), the negative current collector plate (34) is connected to a side of the second insulating part (352) near the battery cell (2).

7. The battery according to claim 5, wherein a groove (20) is provided on an end of the battery cell (2), the insulating part (35) is provided in the groove (20).

8. The battery according to claim 3, wherein the end cover structure (3) further comprises an insulating part (35), the insulating part (35) is provided on the battery cell (2), and a side of the insulating part (35) is connected with the positive current collector plate (33), another side of the insulating part (35) is connected with the negative current collector plate (34).

9. The battery according to claim 8, wherein the insulating part (35) comprises a first insulating part (351) and an second insulating part (352), the first insulating part (351) and the second insulating part (352) are not located on a same plane, the positive current collector plate (33) is connected to a side of the first insulating part (351) facing away from the battery cell (2), the negative current collector plate (34) is connected to a side of the second insulating part (352) near the battery cell (2).

10. The battery according to claim 8, wherein a groove (20) is provided on an end of the battery cell (2), the insulating part (35) is provided in the groove (20).

11. The battery according to claim 2, wherein the negative current collector plate (34) is provided with a connecting convex part (341) facing away from to the battery cell (2), the cover plate (32) is provided with a connecting concave part (321) facing the battery cell (2), and the connecting convex part (341) abuts the connecting concave part (321).

12. The battery according to claim 3, wherein the negative current collector plate (34) is provided with a connecting convex part (341) facing away from to the battery cell (2), the cover plate (32) is provided with a connecting concave part (321) facing the battery cell (2), and the connecting convex part (341) abuts the connecting concave part (321).

13. The battery according to claim 4, wherein the negative current collector plate (34) is provided with a connecting convex part (341) facing away from to the battery cell (2), the cover plate (32) is provided with a connecting concave part (321) facing the battery cell (2), and the connecting convex part (341) abuts the connecting concave part (321).

14. The battery according to claim 1, wherein the positive electrode column (31) and the cover plate (32) are riveted to form an accommodating slot (311) on the positive electrode column (31), the insulating sealing part (360) is sandwiched between the accommodating slot (311) and the cover plate (32).

15. The battery according to claim 2, wherein the positive electrode column (31) and the cover plate (32) are riveted to form an accommodating slot (311) on the positive electrode column (31), the insulating sealing part (360) is sandwiched between the accommodating slot (311) and the cover plate (32).

16. The battery according to claim 3, wherein the positive electrode column (31) and the cover plate (32) are riveted to form an accommodating slot (311) on the positive electrode column (31), the insulating sealing part (360) is sandwiched between the accommodating slot (311) and the cover plate (32).

17. The battery according to claim 4, wherein the positive electrode column (31) and the cover plate (32) are riveted to form an accommodating slot (311) on the positive electrode column (31), the insulating sealing part (360) is sandwiched between the accommodating slot (311) and the cover plate (32).

\* \* \* \* \*